(No Model.)
I. M. FURBISH.
HAND DRILL.
No. 298,457. Patented May 13, 1884.
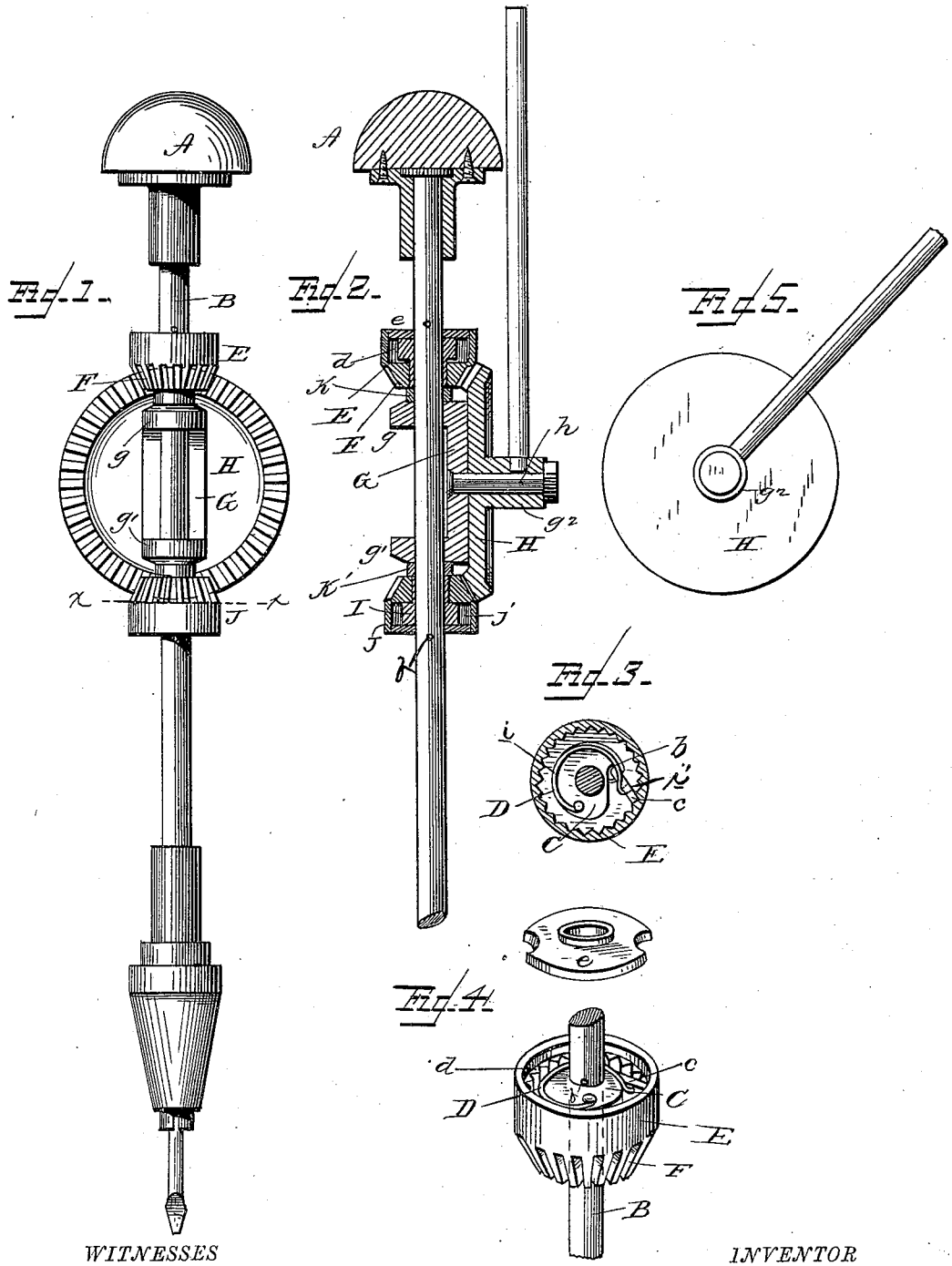
WITNESSES
INVENTOR

UNITED STATES PATENT OFFICE.

ISAIAH M. FURBISH, OF AUGUSTA, MAINE.

HAND-DRILL.

SPECIFICATION forming part of Letters Patent No. 298,457, dated May 13, 1884.

Application filed December 5, 1883. (No model.)

*To all whom it may concern:*

Be it known that I, ISAIAH M. FURBISH, a citizen of the United States, residing at Augusta, in the county of Kennebec and State of Maine, have invented a new and useful Hand-Drill, of which the following is a specification, reference being had to the accompanying drawings.

My invention relates to hand-drills, and more particularly to that class to be operated by a set of gear-wheels, and other mechanism arranged upon a suitable spindle; and it consists in the improved construction hereinafter fully described, and pointed out in the claim.

In the drawings, Figure 1 is a front elevation of my improved drill. Fig. 2 is a longitudinal section of the same. Fig. 3 is a section on the line $x\ x$ of Fig. 1. Fig. 4 is a detail view in perspective, and Fig. 5 is a rear view of the gear-wheel carrying the operating-handle.

A represents the handle for holding the drill in position upon the material to be operated upon, and which is loosely mounted on the end of the spindle B.

C represents a disk rigidly mounted on the spindle B near its upper end. The side of this disk C has a recess provided with a notch, $b$, in which a pawl, $c$, is pivoted in any suitable manner.

D represents a spring arranged to act against the said pawl in such a manner as to force it laterally in an outward direction.

E represents a sleeve or collar provided on its inner side with a circumferential series of V-shaped teeth, $d$. The said sleeve or collar E is fitted over the disk C, and is provided with a cap, $e$, to prevent the entrance of foreign matter to the working parts of the disk C, and held in position upon the spindle against upward movement by a transverse pin, $f$, passing through said spindle. This sleeve or collar E is provided at its lower end with a circumferential series of beveled teeth or cogs, F.

G represents a bracket mounted upon the spindle B, which may be said to be oblong in shape, and provided at its ends with outwardly-projecting perforated lugs $g\ g'$.

H represents a beveled gear-wheel, which is mounted on a shaft or trunnion, $h$, extending from the outer side of the bracket G. This gear-wheel H is provided on its rear side with a collar, $g^2$, which is formed integral therewith, and provided with an opening, $h'$, to receive a suitable operating-handle, $h^2$.

I represents a disk provided with a spring and pawl, $i\ i'$, and a sleeve, J, provided with beveled teeth $j$, all being constructed and arranged as the one hereinbefore described. This disk and collar are located on the spindle in close proximity to the lower end of the bracket G, the beveled teeth engaging the gear-wheel.

K K' represent rings or washers arranged upon the spindle between the ends of the bracket G and the sleeves or collars E J.

The operation is as follows: The handle is oscillated, thus imparting an oscillatory movement to the gear-wheel, which partially revolves or rotates the sleeves. The same being arranged upon opposite sides of the gear-wheel, they are revolved in opposite directions; hence when the pawl on one of the disks is engaging the teeth on the inner side of the sleeve, the other pawl is disengaged and slides loosely over the teeth until the motion to the handle is reversed, when the latter-mentioned pawl is engaged and the other pawl disengaged, from which it will be seen that a continuous rotary motion is imparted to the spindle. The said spindle is provided with a chuck of any desired construction to receive different sizes and kinds of boring or drilling tools.

It will be apparent that the device above described is simple in construction, and affords ready means for boring or drilling metal and other material.

Having fully described my invention, what I claim as new, and desire to secure by Letters Patent, is—

In a hand-drill, the combination, with a spindle carrying disks rigid thereon, collars inclosing said disks, said collars being provided on their inner sides with a series of teeth, pawls pivoted on said disks, springs to hold the same in position, cap-plates $e$, inclosing the ends of said collars, which are also provided with teeth upon their outer sides, and a gear-wheel suitably mounted for operating the same, substantially as set forth.

In testimony that I claim the foregoing as my own I have hereto affixed my signature in presence of two witnesses.

ISAIAH M. FURBISH.

Witnesses:
SAMUEL TITCOMB,
F. L. HAMLIN.